United States Patent Office 3,308,062
Patented Mar. 7, 1967

3,308,062
PROCESS FOR PREVENTING THE FORMATION
OF BOILER SCALE
Donald A. Gunther, Erie, Pa., assignor to American Sterilizer Company, Erie, Pa., a corporation of Pennsylvania
No Drawing. Filed Mar. 24, 1965, Ser. No. 442,500
1 Claim. (Cl. 210—58)

This invention relates to the treatment of water in steam boilers, evaporators, stills, and the like, and, more particularly, to the use of gluconic acid in an amount to prevent the formation of scale.

It is common knowledge to those active in the field that certain acid and sequestering agents, when added to water, will prevent scale from forming in water evaporator pans, boilers, and the like. All such materials are also known to be only moderately effective in preventing scale and/or they introduce into the condensed vapor or distillate dissolved gaseous contaminants which are identified as carbon dioxide, ammonia, and amines. Besides lowering the general quality of the distillate in terms of specific resistance, these contaminants are objectionable for many chemical and clinical applications.

The process disclosed herein uses a sequesterant that is commonly known in other applications but which has been found to be effective in this application only under definite and rigid controlled conditions. The agent used in the process disclosed herein is gluconic acid. It has been discovered that gluconic acid will be one hundred percent effective in preventing the scale forming in boilers, evaporators, and the like and will introduce no contamination to the distillate if it is fed to the water so as to maintain a pH of 8.5 in the boiling evaporator. At higher pH values, this agent is ineffective and, at lower pH values the acid character rather than the sequesterant character predominates with the characteristic contamination by carbon dioxide. This process requires a proportioning feeding device and, once properly adjusted, will maintain its effectiveness unattended and requires no other treatment.

It is, accordingly, an object of the present invention to provide an improved process for preventing boiler scale formation.

Another object of the invention is to provide a process for preventing the formation of scale by the use of gluconic acid.

Still another object of the invention is to provide a process for preventing the formation of boiler scale wherein gluconic acid is fed at a continuous rate to the boiler water.

These and other objects of the invention will be apparent from the ensuing description and the appended claim.

In the device disclosed, water is fed in from a pipe and a gluconic acid metering device is provided. The metering device is of the type familiar to those skilled in the art for metering a definite amount of gluconic acid to the feed water.

The metering device will be adjusted so that the correct amount of gluconic acid is fed to the boiler feed water prior to the time it enters the boiler or as it enters the boiler in an amount which will maintain the pH of the boiling water at approximately 8.5. This amount can be readily determined by periodically sampling the water from the overflow of the still. All stills will have an overflow. The testing can be done with a conventional pH meter. The gluconic acid can be increased or decreased to control it to the optimum value of 8.5.

While an example of the invention has been disclosed, it is obvious that it may be embodied in other forms covered and defined by the appended claim.

The embodiments of the invention in which an exclusive property or privilege is claimed are defined as follows:

A process of preventing boiler scale from forming in a boiler evaporator comprising
    providing a boiler evaporator,
    providing water to be evaporated in said boiler evaporator,
    and placing a treating agent consisting essentially of gluconic acid in said water to bring the pH of said boiling water to approximately 8.5, and maintaining said boiling water at said pH of approximately 8.5 by said addition of said gluconic acid.

References Cited by the Examiner
UNITED STATES PATENTS

| 2,584,017 | 1/1952 | Dvorkovitz et al. | 252—156 |
| 2,615,846 | 10/1952 | Dvorkovitz et al. | 252—156 |
| 3,099,521 | 7/1963 | Arensberg | 210—58 X |

OTHER REFERENCES

Betz: Handbook of Industrial Water Conditioning, fifth edition, 1958, Betz Laboratories, Philadelphia, Pa., pp. 80–81.

Hackh's Chemical Dictionary, third edition, 1944, McGraw-Hill, pp. 136–137.

Martell, A. E., et al.: Chemistry of the Metal Chelate Compounds, 1952, Prentice-Hall, Englewood Cliffs, N.J., pp. 490–495, 511 and 542.

Niven: Industrial Detergency, 1955, Reinhold, New York, N.Y., pp. 47–50 relied on.

MORRIS, O. WOLK, Primary Examiner.

MICHAEL E. ROGERS, Examiner.